United States Patent [19]

Herring

[11] 3,738,473

[45] June 12, 1973

[54] CENTERING MECHANISM FOR COMPONENT SEQUENCING MACHINE

[75] Inventor: Lloyd D. Herring, Jenison, Mich.

[73] Assignee: Rowe International Inc., Whippany, N.J.

[22] Filed: Mar. 22, 1972

[21] Appl. No.: 237,014

[52] U.S. Cl. .......... 198/29
[51] Int. Cl. .......... B65g 47/22
[58] Field of Search .......... 198/29, 165; 53/198

[56] References Cited

FOREIGN PATENTS OR APPLICATIONS 251,466 1/1967 Austria .......... 198/29

*Primary Examiner*—Edward A. Sroka
*Attorney*—Henry L. Shenier, Francis M. O'Connor and Richard S. Shenier

[57] ABSTRACT

Apparatus for centering electrical components in the space between a pair of grooved lead-supporting conveyor belts which advance the components toward tape-applying apparatus for forming a string of components in a predetermined sequence in which an elongated manifold aligned with the center line between the conveyor belts and located therebelow and slightly inclined downwardly from the belts in a direction away from the tape-applying apparatus is formed with longitudinally spaced nozzles and is supplied with air under pressure to create a plurality of air jets directed into the space between the belts to produce a centering action on the components and in which retainer bars located over the belts prevent the components from being blown off the belts.

10 Claims, 4 Drawing Figures

CENTERING MECHANISM FOR COMPONENT SEQUENCING MACHINE

BACKGROUND OF THE INVENTION

There are known in the prior art machines for making up strings of electrical components carried by tapes and arranged in a predetermined sequence. Tapes produced by these sequencing machines are installed on automatic component inserting machines which are so programmed as to insert the components into the proper positions on a circuit board so long as the components on the tape are in the proper predetermined sequence. The copending application of John G. Grafford, Ser. No. 172,429 filed Aug. 17, 1971, now U.S. Pat. No. 3,710,482 discloses a semi-automatic sequencing machine for assembling a plurality of electrical components in a predetermined sequence with respective pairs of tapes receiving the component leads so as to form the string. In the apparatus disclosed in the Grafford application, a pair of notched belts are arranged in spaced relationship to permit components to be placed thereon with the components in the space between the belts and with the component leads located in notches in the belts. These belts are then driven in synchronism to carry the components to other mechanism which applies tapes to the leads to form the string.

In operation of the component insertion machine the leads of components on the tape are bent at right angles to the axis of the component body for insertion in the circuit board. Such bends must of necessity be close to the component body in many instances. In forming such bends the insertion machine gauges the position of a component body by sensing the inside edges of the two rows of tape which support the component leads. It will readily be apparent that a component must be centered between the rows of tape or the component may be broken or damaged in the course of the lead bending operation.

It has been proposed that a sequencing machine of the type described above be provided with spring-loaded guides which act on the component bodies to produce a centering action before the tape is applied to the leads. Such an arrangement, however, has not proved satisfactory owing to variations in component body length and diameter and in lead diameter. The unsymmetrical shapes of many bodies as well as bent leads add to the difficulty of centering all components. Such spring-loaded guides wear relatively rapidly. They require careful adjustment for proper centering action.

I have invented a centering mechanism for a component sequencing machine which overcomes the defects of the prior art pointed out above. My centering mechanism ensures that the bodies of all components are symmetrical with the center line of the conveyor formed by the belts. My mechanism requires substantially no adjustment after initial installation. It accommodates component bodies of a wide variety of shapes and sizes. It has a long life. It is simple in construction and in operation for the result achieved thereby.

SUMMARY OF THE INVENTION

One object of my invention is to provide a centering mechanism which is especially adapted for use in an electrical component sequencing machine.

Another object of my invention is to provide a centering mechanism for a component sequencing machine which ensures that the bodies of all components of a string are generally symmetrical to the center line of the string.

A further object of my invention is to provide a centering mechanism for a component sequencing machine which accommodates component bodies of a wide variety of shapes and sizes.

Yet another object of my invention is to provide a centering mechanism for a component sequencing machine which requires little or no adjustment after installation.

Still another object of my invention is to provide a centering mechanism for a component sequencing machine which is simple in construction and in operation for the result achieved thereby.

In general, my invention contemplates the provision of a centering mechanism for a component sequencing machine having a pair of spaced, notched belts forming a conveyor with a center line which conveyor receives components with the bodies between the belts and with the leads in the notches in which an elongated manifold is disposed below and in the region of the center line of the conveyor and is provided with a plurality of openings forming jets of air directed into the space between the belts and which act on the components to produce an effect which centers the components between the belts. Preferably, I incline the manifold downwardly and rearwardly with respect to the direction of movement of the conveyor and I provide rails over the belts for retaining components on the conveyor.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figures 1, 3:
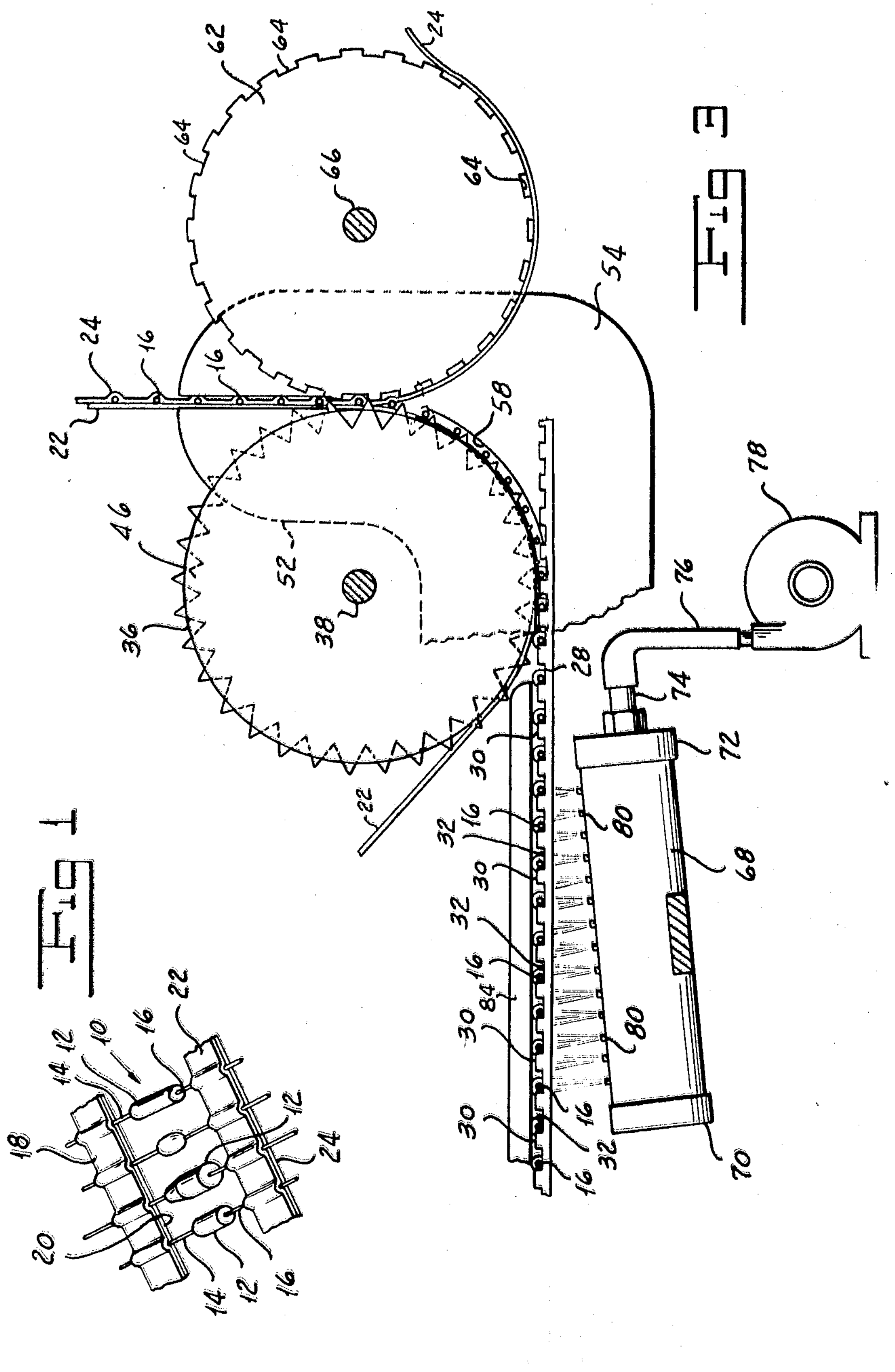
FIG. 1 is a perspective view of a portion of a string of electrical components formed by a sequencing machine with which my centering mechanism is employed.
FIG. 3 is a fragmentary sectional view of a component sequencing machine incorporating my centering mechanism.
Figure 2:
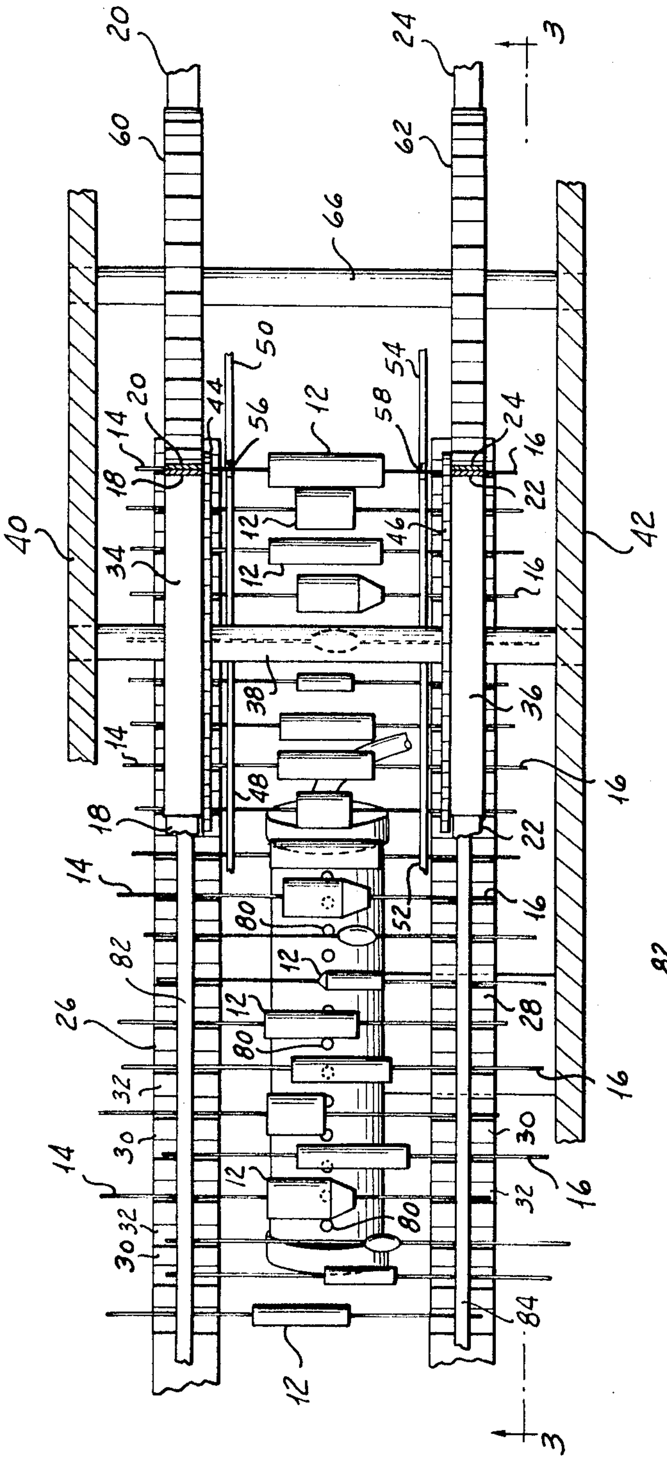
FIG. 2 is a fragmentary top plan of a component sequencing machine incorporating my centering mechanism.
Figure 4:
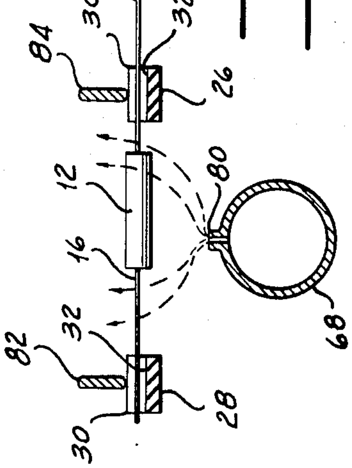
FIG. 4 is a sectional view of my centering mechanism taken along the line 4—4 of FIG. 3.

Referring now to the drawings, a string indicated generally by the reference character 10, of a plurality of components 12 formed on a machine with which my centering mechanism is used, includes the components 12, each of which has a pair of outwardly extending leads 14 and 16. After the string is completed the leads 14 are sandwiched between two lengths 18 and 20 of pressure-sensitive tape and the leads 16 are sandwiched between two lengths 22 and 24 of pressure-sensitive tape. As has been explained hereinabove, it is necessary that the bodies of the components 12 be generally symmetrically disposed with relation to the center line of the string 10.

One form of sequencing machine with which my centering mechanism is adapted to be used is disclosed in the co-pending Grafford application referred to hereinabove. As is more fully pointed out in the co-pending application, the sequencing apparatus includes a pair of spaced belts 26 and 28, each of which is provided with a plurality of teeth 30, the spaces between which form notches 32. The respective belts 26 and 28 extend from a station (not shown) at which components are placed on the belts to respective pressure wheels 34 and 36 supported on a shaft 38 carried by the machine frame members 40 and 42. Shaft 38 also carries respective star wheels 44 and 46. In operation of the apparatus, as the belts 26 and 28 advance the components toward wheels 44 and 46 the teeth of the wheels engage the component leads to carry them into respective guide slots 56 and 58 formed by pairs of upper and lower guide plates 48 and 50 and 52 and 54. These plates guide the leads along an arcuate path which is concentric with the shaft 38. At the same time, tapes 18 and 22 from suitable supplies are carried by pressure wheels 34 and 36 into contact with the leads.

Respective notched pressure wheels 60 and 62 each of which is formed with peripherally spaced notches 64 are carried by a shaft 66 supported for rotation on the frame members 40 and 42. Respective lengths of tape 20 and 24 extend downwardly and under the pressure wheels 60 and 62. As is more fully explained in the co-pending Grafford application, wheels 60 and 62 are associated with wheels 34 and 36. As the leads advance along the guides 58 they finally arrive at the nips between the two pairs of wheels 60 and 34 and 62 and 36. At that location, the lengths 18 and 20 and the lengths 22 and 24 of pressure sensitive tape are squeezed together with the leads at the locations of notches 64 to form the string.

As is pointed out hereinabove, it is necessary that the components 12 be as nearly centered as possible on the center line of the conveyor formed by the two belts 26 and 28. Moreover, it will readily be appreciated that all of the components are not of the same size and shape. I mount a generally cylindrical manifold 68 on the frame formed by members 40 and 42 below the space between the belts 26 and 28 with the axis of the manifold extending generally in the direction of the center line of the conveyor. Manifold 68 includes end caps 70 and 72 and a fitting 74 at the end cap 72 for connecting the interior of the manifold to a length 76 of tubing leading to a suitable source of air under pressure 78.

I form manifold 68 with a plurality of spaced, aligned nozzles 80 all of which register with the center line of the conveyor. Nozzles 80 produce respective jets of air directed into the space between the belts 26 and 28 adjacent to the center line of the conveyor so as to provide a centering action on the components. Preferably I incline the manifold 68 slightly downwardly and rearwardly with respect to the direction of travel of the belt, so that the centering action increases from a relatively gentle action to a firmer action as the components approach the tape-applying mechanism. That is, the jets which are further from the components cover greater areas so as to act on components which are relatively far off center. However, the resultant force of such a jet on a component which is far out of line will not fully center the components. The progressively closer jets act on the component as it progresses with the belts so as fully to center the component. I arrange respective guide bars 82 and 84 over the belts to prevent the leads from being blown entirely out of the belt notches 32.

In operation of my centering mechanism components are placed on the conveyor formed by the belts 26 and 28 in the manner described in the co-pending Grafford application. As the belts are driven to carry the components toward the tape-applying mechanism, the jets of air produced by nozzles 80 exert a centering action thereon.

The first jets encountered by a component exert a relatively gentle centering action which tends to move components which are far off center closer to the center. The resultant force of these jets, however, on components which are only slightly off center is not sufficient accurately to center such components. As the components encounter jets which are closer to the components, sufficient force is exerted thereon to center the components fully. Consequently the resultant string of components can be used on a component-inserting machine without possible damage to the component bodies in the course of the lead-bending operation.

It will be seen that I have accomplished the objects of my invention. I have provided a centering mechanism for a component sequencing machine which overcomes the defects of mechanisms of the prior art. My mechanism is adapted to handle component bodies of a wide variety of shapes and sizes. It requires little or no adjustment after initial installation. It has a long life. It is simple in construction and in operation for the result achieved thereby.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A machine for forming a string of electrical components including in combination, spaced belts forming a conveyor having a longitudinal centerline, said belts adapted to support the electrical components for movement from a receiving station to a work station, centering apparatus comprising, means for producing a jet of fluid, and means mounting said jet-producing means adjacent to said centerline with said jet directed toward the space between said belts to cause said fluid to tend to center said components on said conveyor.

2. Centering apparatus as in claim 1 in which said jet-producing means comprises means for producing a plurality of jets of fluid spaced along the direction of said centerline.

3. Centering apparatus as in claim 2 in which said jet-producing means is below said spaced belts.

4. Centering apparatus as in claim 3 including means positioned over said belts for retaining said components on said belts.

5. Centering apparatus as in claim 4 in which said jet-producing means comprises an elongated manifold, said manifold being slightly downwardly inclined in a direction from said work station toward said receiving station.

6. Apparatus for conveying electrical components having generally oppositely extending leads from a receiving station to a work station including in combination means comprising a pair of spaced belts forming a conveyor having a longitudinal centerline, said belts adapted to receive said leads to support said components therebetween, means for producing a jet of fluid and means mounting said jet-producing means adjacent to said centerline with said jet directed toward the space between said belts to cause said fluid to exert a centering effect on said components.

7. Apparatus as in claim 6 in which said jet-producing means comprises means for producing a plurality of jets of fluid spaced along said centerline and directed into the space between said belts.

8. Apparatus as in claim 7 in which said jet-producing means is disposed below said centerline.

9. Apparatus as in claim 8 in which said jets are spaced progressively further away from said centerline along said centerline in a direction from said work station to said receiving station.

10. Apparatus as in claim 9 in which said belts have notches for receiving said leads.

* * * * *